United States Patent Office

3,308,083
Patented Mar. 7, 1967

3,308,083
STABLE EMULSIONS OF VINYL ACETATE POLYMERS CONTAINING AN AMMONIUM CARBOXYLATE
Alonzo L. Mantz, Tarrytown, N.Y., assignor to Union Carbide Corporation, a corporation of New York
No Drawing. Filed May 1, 1961, Ser. No. 106,481
3 Claims. (Cl. 260—29.6)

This invention relates to emulsion polymerization of vinyl acetate and comonomers. In a particular aspect, this invention relates to an improved process for producing stable aqueous dispersions of polyvinyl acetate.

There is continuous research effort to produce stable polyvinyl acetate emulsions which can be shipped and stored for indefinite periods of time without coagulation and which, when applied to substrates, produce films which dry at room temperature and do not redisperse when contacted with water.

In the use of polyvinyl acetate emulsions as coatings and adhesives, difficulties have arisen because of the lack of adequate water resistance. The presence of a dispersing agent such as polyvinyl alcohol or hydroxyethyl cellulose used in producing the emulsion is mainly responsible for the lack of water resistance in films prepared from the emulsions. The dispersing agent tends to cause the polymer film to redisperse thereby imparting to the film the effect of water solubility.

The processing, handling, distribution and storage of paints and other coating compositions incorporating these emulsions require that they withstand severe mechanical agitation and extreme temperature variation. Under these conditions, the entire composition may irreversibly form into a mass or coagulate to an extent which destroys their usefulness.

It is an object of the present invention to provide a process for the production of improved polyvinyl acetate emulsion compositions.

It is a further object of this invention to provide polyvinyl acetate and vinyl acetate interpolymer emulsions which are stable during storage and shipment and which are capable of withstanding severe conditions without losing any of their original properties.

It is still another object of the present invention to prepare polyvinyl acetate emulsions which can be cast into films which are substantially water resistant and which can produce films without the necessity of chemical and heat treatments.

Other objects and advantages of the present invention will become apparent to those skilled in the art from the accompanying description and disclosure.

Accordingly, one or more objects of the present invention are accomplished by an improved process for the preparation of stable emulsions of polymers which comprises adding to an aqueous polymerization medium maintained at a temperature between about 60° C. and 90° C. a polymerizable monomer charge of vinyl acetate and between 0 and 40 percent by weight, based on the total monomer weight, of monomer selected from vinyl esters of lower alkanoic acids, and lower alkyl esters of acrylic acids and substituted acrylic acids, at a rate between about 10 and 50 weight percent of the monomer charge per hour, wherein said polymerization medium has a pH between about 4 and 8 and contains additionally a mixture of components comprising emulsion polymerization catalyst, nonionic emulsifier, anionic emulsifier and ammonium salt of organic acid containing between two and about ten carbon atoms. The water content of the polymerization medium is adjusted so as to provide a final total solids content of the emulsion of between about 15 and 70 weight percent. The reaction time of the polymerization process is usually extended beyond the addition period sufficiently long to reduce the residual monomer content of the emulsion medium below about 0.2 percent of the total monomer charge. The total reaction time will generally be in the range between about two and eight hours, and more usually in the range between about three and six hours.

The optimum rate of addition of the monomer charge to the polymerization medium will vary depending on the nature of the monomers, the reaction temperature, and the other reaction conditions. The usual rate of addition is between about 10 and 50 weight percent of the monomer charge per hour, and it is advantageous to add approximately 10 or 15 percent of the total monomer charge to the polymerization medium before the process is commenced in order to bring the medium temperature up to reaction temperature by means of the exothermic reaction which ensues.

The monomer charge can consist entirely of vinyl acetate or it can contain up to 40 weight percent based on the total monomer weight of monomers selected from vinyl esters of lower alkanoic acids and lower alkyl esters of acrylic acid and substituted acrylic acid. Illustrative of these classes of vinyl monomers are vinyl propionate, vinyl butyrate, vinyl 2-ethylhexoate, vinyl chloroacetate, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, n-decyl acrylate, ethyl methacrylate, n-butyl methacrylate, 2-ethylhexyl methacrylate, n-decyl methacrylate, ethyl crotonate, butyl cinnamate, 2-ethylhexyl atropate, diethyl maleate and didecyl itaconate.

The polymerization medium to which the monomer charge is added contains a mixture of components, each of which is essential for the production of a final emulsion product which is stable under handling and storage conditions and to freeze-thaw and other extreme conditions. The component of the polymerization medium which is of particular importance is the ammonium salt of organic acid containing between two and about ten carbon atoms. If this particular type of salt is not included in the polymerization medium, one does not obtain the stable emulsions of this invention which can be cast as continuous, water-resistant films. It has also been found that undesirable results are obtained if salts other than those specified herein are employed. For example, salts such as sodium acetate, sodium benzoate, sodium carbonate, potassium carbonate, borax, and the like, are unsuitable for use in the practice of the present invention. Unexpectedly, it has been found that excellent stable emulsions are produced when ammonium salts of organic acids are employed. Illustrative of suitable salts are ammonium salts of carboxylic acids such as ammonium acetate, ammonium benzoate, ammonium acrylate, ammonium citrate, ammonium octoate, and the like. Ammonium acetate provides particularly outstanding results and is therefore preferred in the practice of the present invention. The ammonium salt of organic acid is employed in a quantity between about 0.05 and 1.0 weight percent, based on the total weight of monomer, and preferably in a quantity between about 0.1 and 0.7 weight percent. The controlling factor in determining the particular weight of ammonium salt of organic acid to be employed is the pH of the polymerization medium. The ammonium salt of organic acid is employed in a quantity sufficient to provide a pH of the polymerization medium in the range between about 4 and 8, and preferably in the range between about 4.5 and 7. The ammonium salt acts as a buffer for the polymerization medium and has the primary advantage of acting as a stabilizer. The other salts mentioned above as being unsuitable in the practice of this invention provide the necessary buffering reactivity but do not act as stabilizers for the final emulsion product.

Another essential component of the polymerization medium is a nonionic emulsifier. The suitable nonionic emulsifiers are the water-miscible variety of poly(alkylene oxide) polymers which have a molecular weight above about fifteen hundred. Among the suitable commercial nonionic emulsifiers are those sold under the trade names of Tergitol XD and Tergitol XH, and Pluronic F68 and Pluronic L62. In general, the water-miscible nonionic emulsifiers which can be employed are those produced by reacting an aliphatic alcohol with alkylene oxide reactants such as ethylene oxide and propylene oxide. The polyalkylene glycol nonionic emulsifiers generally consist of a hydrophobe comprising an aliphatic alcohol having attached thereto a heteric mixed chain of ethylene oxide and propylene oxide groups and attached to the heteric chain a hydrophile comprising a chain of ethylene oxide groups, the weight ratio of hydrophile to hydrophobe being about one. Other nonionic emulsifiers such as the class of adduct products derived from nonyl phenol and alkylene oxide are unsuitable for the production of the stable emulsions of the present invention.

Also required as a component of the polymerization medium is a water-miscible anionic emulsifier. This component is selected from any of the well-known available commercial anionic emulsifiers which are sold under trade names such as Duponol Me. The water-miscible anionic emulsifiers include classes of materials such as alkyl sulfate salts, alkyl aryl sulfonates, salts of fatty acids, alkyl sulfosuccinate salts, and the like.

The nonionic emulsifier is employed in a quantity between about 1 and 6 weight percent based on the monomer weight, and the anionic emulsifier is employed in a quantity between about 0.25 and 2 weight percent based on the monomer weight. It is preferred to employ the two emulsifiers in a ratio to each other of between about 1 and 8 parts by weight of nonionic emulsifier per part by weight of anionic emulsifier. A highly preferred ratio is about 3 parts by weight of nonionic emulsifier per part by weight of anionic emulsifier.

The polymerization reaction is conducted in the presence of an emulsion polymerization catalyst. The catalyst is employed in a quantity between about 0.05 and 1 weight percent based on the monomer charge. Preferred catalysts include peroxygen compounds such as hydrogen peroxide and organic peroxides such as benzoyl peroxide, acetyl peroxide, or the like, and organic or inorganic peracids or salts thereof such as peracetic acid, perborates and persulfates. The best results generally are obtained by the use of a water-soluble peroxygen compound. The peroxygen compound may or may not be activated by the inclusion of a reducing agent such as bisulfite, sulfurous acid, sulfoxolate, or other sulfoxy compound having reducing properties, such as sodium bisulfite, potassium bisulfite, sodium sulfite, potassium sulfite, sodium hydrosulfite, potassium hydrosulfite, sodium formaldehyde sulfoxylate, potassium formaldehyde sulfoxylate, zinc formaldehyde aldehyde sulfoxylate, and the like.

The quantity of water in the aqueous emulsion polymerization system is generally maintained in a range providing a final solids content of the emulsion product of between about 15 and 70 weight percent.

The latex compositions produced by the practice of the present invention are characterized by a dispersed polymer which has a particle size below 0.5 micron and usually in the range between about 0.1 and 0.4 micron. The relative average molecular weight of the dispersed polymer is indicated by reference to "resin grade" values.

The "resin grade" of the polymers of the present invention is in the range between about 4 and 9. "Grade" is the absolute viscosity of a base-molar solution of the resin dissolved in benzene. To obviate solution difficulties, absolute viscosities are determined on latices dissolved in dimethylformamide and grade values are estimated from an established curve obtained by plotting grade versus absolute viscosity. Latex is dissolved in dimethylformamide and water to provide a resin-water-solvent ratio of 2:5:93. When the resin has been completely dissolved, the viscosity of the solution is determined at 20° C. using a capillary type viscometer. The resin grade value is a function of molecular weight.

The latex compositions exhibit excellent mechanical stability and can be stored indefinitely or subjected to severe freeze-thaw conditions without any adverse effects. The latex compositions are further characterized by a high pigment-loading capacity. The weight of pigment in the latex compositions can vary between about 5 and 70 percent pigment volume concentration (PVC).[1] Well-known conventional pigments can be employed such as titanium dioxide, carbon black, cadmium sulfide, copper phthalocyanine, zinc oxide, chromium oxide, calcium carbonate, basic lead carbonate, barium sulfate, and the like. Pigments, filming aids, and the like, can be incorporated into the latex composition simply by adding the materials with stirring. While it is possible to combine pigments and the like with the latex dispersion and to grind the mixture on a three-roll mill or on a colloid mill, it is desirable to prepare a paste of pigment or color in water with the aid of a dispersing agent and combine such paste with the latex composition. In the preparation of such pigment paste, it is best to mix the water, pigment and dispersing agent and grind the mixture in a pebble mill, roll mill or high shear mixer.

The coatings prepared from the emulsion compositions have excellent adhesion to substrates and have excellent resistance to moisture. In a typical preparation of an emulsion composition of the present invention, an initial aqueous charge is prepared having a composition illustrated by the following:

| | Grams |
|---|---|
| Deionized water | 600–700 |
| Tergitol XH | 16–32 |
| Duponol Me | 4–10 |
| Ammonium acetate | 1–4 |
| Ammonium persulfate | 1–4 |
| Sodium bisulfite | 0–2 |
| Monomer charge: (homopolymer) "Niacet" vinyl acetate 0.1 percent HQ | 800 |
| or | |
| Monomer charge: (copolymer) "Niacet" vinyl acetate 0.1 percent HQ | 500–780 |
| 2-ethylhexyl acrylate 0.1 percent MMHQ | 20–300 |

The ingredients of the aqueous charge are introduced into a glass resin reaction flask equipped with a reflux condenser, a thermometer, a power-driven paddle stirrer, a dropping funnel and a nitrogen inlet tube. The mixture is heated to 60° C., stirred to form a clear homogeneous solution, and the reaction medium is slowly purged with a stream of nitrogen. The monomer charge is added at a uniform rate over a two-hour addition period. During the polymerization, the polymerization medium temperature rises gradually to approximately 72° C. After the addition of the monomer charge is completed, the polymerization reaction is continued for an additional forty minutes to insure complete polymerization. The resulting latex has a pH of 5.0 to 5.4 and a total solids content of 55 percent.

In the following examples the pH of the emulsion composition is measured at room temperature by a Beckman pocket-type pH meter equipped with a unified glass-calomel electrode. The mechanical stability of the latex compositions is determined by subjecting the latex to fifteen minutes of high shearing action in a Waring Blendor or Brookfield Counter-Rotating Mixer. A stable ---
[1] Percentage of total volume of all the solids (pigment plus binder) in the paint composition.

latex does not coagulate under these conditions. The latex viscosity is determined at room temperature with a Brookfield viscometer, Model RVF. The spindle speed is 20 r.p.m. and the spindle number is varied according to the viscosity range. Readings are taken at one-minute intervals until a constant value is obtained. The viscosities are reported in centipoises. The particle size of the dispersed resin in the emulsion compositions is determined with a light microscope at about 1450–X to determine particle size down to about 0.3 micron. For the determination of particle size below about 0.3 micron an electron microscope or a Brice Phoenix light scattering instrument is employed.

For the preparation of film samples a draw-down of the latex is made on a clean glass plate employing an applicator with a 10 mil wet film clearance. The films are air dried at room temperature for approximately one hour and then heated for one hour in an oven at 80° C. A free film is obtained by stripping the coating away from the glass panel after cooling to room temperature. Films prepared by this procedure usually are about 3 to mils thick.

The procedure for testing water whitening of the films is based on a spectrophotometric measurement of the amount of light transmitted through a standard sample of film immersed in distilled water. The instrument used is a Bausch and Lomb Spectronic 20 spectrophotometer. To measure water whitening a cell containing distilled water is placed in the instrument and the percent transmittance dial is set so the needle will read 100 percent. A sample of film held in a special frame is immersed in the cell perpendicular to the light path and a measurement of immersion time is commenced. The percent transmittance reading on the dial is recorded after twenty-, forty- and sixty-second intervals, and then at one-minute intervals thereafter.

For the measurement of hardness, coatings are cast on glass plates and then stored for several days in a constant temperature room at 21° C. and 65 percent relative humidity. The measurements are conducted with a Walker-Steele swinging pendulum apparatus. A pair of spherical steel balls are allowed to roll back and forth on the film surface. A pendulum arm attached to the balls sweeps out a constantly decreasing arc over a scale. The time required for a given decrease in arc length is measured. The harder a film, the less resistance there is to movement of the steel balls and the longer the time required for a given decrease in arc length. The brittle point of the cast films for the purposes of this invention disclosure can be defined as the temperature which is just low enough to cause a film of specific thickness to break when bent in a standard manner.

To test water streaking of pigmented latex coatings, panels are supported at a forty-five degree angle, and twenty-five milliliters of distilled water are permitted to run down the panel in several streams. The panels are allowed to air dry several hours and are then examined for signs of streaking or discoloration. Panels are compared visually and rated as poor, fair, good, very good or excellent. Excellent indicates no discernible marks produced by the water treatment. Very good indicates just the slightest trace of streak.

Wet adhesion tests are run on the same panels used for the water streaking tests. Ten drops of distilled water are placed on the coating surface and covered with a watch glass for one-half hour. The water is then gently wiped off and the coating is examined for blistering. The wetted area is scratched with a knife blade. Wet adhesion is reported as poor, fair, good, or excellent.

Wet crocking tests are run on the water streaking panels after they have aged for one week. A wet pad of cheese cloth is rubbed back and forth across the panel under moderate pressure for twenty-five cycles. The cloth is examined for amount of color absorbed from the paint and the coatings are rated as poor, fair, good, or excellent. Excellent indicates none to just a trace of color absorbed, and poor indicates a considerable amount of color transfer to the cloth.

Scrub resistance of the paint coatings is determined on a Gardner heavy-duty wear tester. The paint panels are retained in position with a specially built clamp with rubber gaskets which prevent any water from wetting the unpainted portion of the paper substrate. A 5.0 percent solution of "Crest" soap is used as the scrubbing solution. "Crest" is a mild abrasive type soap similar to "Lava" hand soap. One pound brushes move back and forth in a straight line over the painted surface, completing two passes every cycle. Percentage failure at a given number of cycles is recorded.

For the determination of freeze-thaw stability of the emulsion compositions a sample jar half filled with emulsion is placed in the freezing compartment of a refrigerator for eighteen hours. The temperature is maintained at about −6° C. to simulate a slow freezing cycle. The sample is allowed to thaw at room temperature for four hours and then examined for coagulation, seeding or thickening. A latex with good stability will pass five or more cycles.

Enamel hold-out test for low temperature coalescence is conducted by applying the latex paint to a panel and drying at low temperature and then examining visually for coalescence after applying an enamel topcoat. The substrate employed is a 6 x 12 inch cement asbestos panel with one-half of its area primed with a latex sealer which has been thoroughly dried at room temperature. The test latex paint is usually an unplasticized vinyl acetate homopolymer system formulated with a standard pigment grind at a PVC of 40 percent. The test paints and panels are cooled to 3° C. in a commercial refrigerator before use. Paint films are then rapidly applied to the panels either by brush or a 10 mil wet film applicator blade in such a manner that each test paint covers a sealed and unsealed portion of the panel. The panels are returned to the refrigerator and allowed to dry for eighteen hours at 3° C. to 4° C. The panels are then brush-coated at room temperature with a tinted commercial eggshell alkyd enamel paint and allowed to air dry for twenty-four hours. The resulting panel has the following types of coated sections:

(a) Enamel over test paint over sealed substrate;
(b) Enamel over test paint over unsealed substrate;
(c) Enamel over sealed substrate;
(d) Enamel over unsealed substrate.

The degree of coalescence in the latex test paint is determined by the depth of color development in enamel topcoat. The color of section (c) represents complete hold-out, whereas section (d) corresponds to little or no hold-out and is many shades lighter than (c). Good coalescence in the test paint is indicated when the color developed in both sections (a) and (b) is the same as that developed in section (c).

For the determination of the flexibility of latex paint coatings the latex paint at 40 percent PVC is applied to a panel with a doctor blade having a wet film clearance of 2 mils. The panel is held flat on a polished steel suction plate. After air drying for eighteen hours the panel is heated for three hours at 105° C. The panel is then cooled for one-half hour at room temperature and then bent over a one-eighth inch mandrel. This test procedure is designed to meet government specifications as described in TP–14 lb.–6221. The test paint on a steel or tin panel must not crack when tested in this fashion.

Impact resistance of latex coatings is tested with a Gardner impact tester which is a falling plunger type calibrated in inch-pound. Impact resistance is measured both on the coated surface of the panel and on the rear of the panel. Results are recorded as the maximum force applied before cracking occurs.

The various trade name materials specified in the examples have the following designated compositions:

Duponol Me—Sodium lauryl sulfate

Tergitol NPX—Ethylene oxide adduct derivative of nonyl phenol; specific gravity 20/20° C., 1.066; solidification temperature, 0° C.

Tergitol 4—$C_4H_9CH(C_2H_5)C_2H_4CH(SO_4Na)$
$$CH_2CH(CH_3)_2$$

Tergitol XH and XD—Water-miscible polyalkylene glycol ether having a molecular weight above about 1500

"Cellosize" WP-09—Hydroxyethyl cellulose, 70–110 cps. (5 percent aqueous solution at 20° C.)

"Cellosize" WP-4400—Hydroxyethyl cellulose, 3500–5000 cps. (2 percent aqueous solution at 20° C.)

Tamol "731"—Carboxylated polyelectrolyte sodium salt, ASP–400

Butyl Carbitol Acetate—Butyl ether of diethylene glycol acetate.

Example 1

Five emulsion compositions were prepared for the purpose of comparing vinyl acetate homopolymers and vinyl acetate copolymers produced according to the present invention with similar homopolymers and copolymers prepared by standard methods. The monomer charge was added to the aqueous polymerization medium over a period of about two hours. After the addition period was completed, the polymerization was conducted for an additional forty-five minutes in order to complete the reaction.

Each of the five emulsion compositions was cast on panels to form a coating. The coated panels were dried at room temperature.

The specific components employed in each of the emulsion preparations are listed in Table I.

Also described in Table I are physical data determined for the individual emulsion compositions and for the respective films cast from the emulsion compositions.

Latex compositions No. 3 and No. 4 in Table I are those prepared according to the present invention. Latex compositions No. 1 and No. 2 are those prepared employing protective colloid as in the standard method of preparation. Latex compositions No. 3 and No. 4 and the films prepared from these compositions were superior to compositions No. 1 and No. 2. Latex compositions No. 3 and No. 4 were also superior to a commercial homopolymer (WC130) and a commercial copolymer (Flexbond 800), which are also listed in Table I.

Latex compositions No. 3 and No. 4 have low viscosities. Homopolymer latex compositions such as No. 3 have viscosities in the range between 50 and 100 centipoises, while copolymer latex compositions such as No. 4 have viscosities in the range between 200 and 600 centipoises. One of the outstanding advantages of the compositions of the present invention, such as latex compositions No. 3 and No. 4 in Table I which are prepared employing a buffer-stabilizer and a combination of a nonionic and anionic emulsifier, is in the resistance to water exhibited by films prepared from the compositions. As seen in Table I, latex compositions No. 3 and No. 4 produce films which yield outstanding results when submitted to the water whitening test. The results of the water whitening test (percent of light transmission after three minutes' immersion) in Table I indicate a very attractive property of the present invention compositions. Table I also demonstrates that the brittle point of the invention compositions ranges approximately 20° F. below the comparable standard latices such as No. 1 and No. 2. Table I also demonstrates that latex compositions No. 3 and No. 4 of this invention are superior to latex compositions No. 1 and No. 2 as well as the two commercial latex compositions listed in Table I in their ability to resist the conditions of the fadometer test at 65° C. for two hundred hours.

Example 2

In a manner similar to the polymerizations conducted in Example 1, polymerization studies were performed employing eleven different varieties of monomer charge. Each of the different kinds of monomer charge were polymerized with a buffer-stabilizer in accordance with the present invention and also with a stabilizer colloid in a standard manner. The same recipes were employed as specified in Table I for the respective polymerization systems. The different emulsion compositions produced are listed in Table II. In Table II there is also included the results of the water whitening, hardness and brittle point tests. As in Example 1, the results demonstrate that the latices produced by the practice of the present invention with a buffer-stabilizer nonionic-anionic emulsifier system are superior to the same resin composition latices which contain a conventional colloid rather than the buffer-stabilizer.

TABLE I

|  | Homopolymer (Colloid) No. 1 | Copolymer (Colloid) No. 2 | Homopolymer (Stabilizer) No. 3 | Copolymer (Stabilizer) No. 4 | Acrylate Styrene Acrylic Acid No. 5 | Commercial [1] Homopolymer WC130 | Commercial [2] Copolymer Flexbond 800 |
|---|---|---|---|---|---|---|---|
| Ingredient: |  |  |  |  |  |  |  |
| Water | 42.6 | 42.6 | 42.6 | 42.6 | 47.4 |  |  |
| "Tergitol" XH |  |  | 1.5 | 1.5 |  |  |  |
| Duponol Me |  |  | 0.5 | 0.5 | 0.20 |  |  |
| Ammonium acetate |  |  | 0.125 | 0.125 |  |  |  |
| Persulfate | 0.29K | 0.29K | 0.125NH₄ | 0.125NH₄ | 0.20NH₄ |  |  |
| Sodium bisulfite |  |  | 0.062 | 0.062 | 0.12 |  |  |
| Vinyl acetate | 55.0 | 46.75 | 55.0 | 46.75 |  |  |  |
| 2-ethylhexyl acrylate |  | 8.25 |  | 8.25 | 24.0 |  |  |
| Borax | 0.35 | 0.35 |  |  |  |  |  |
| "Cellosize" WP-09 | 0.75 | 0.75 |  |  |  |  |  |
| "Tergitol" NPX | 0.80 | 0.80 |  |  | 0.5 |  |  |
| "Tergitol" 4 | 0.20 | 0.20 |  |  |  |  |  |
| Styrene |  |  |  |  | 2.60 |  |  |
| Acrylic acid |  |  |  |  | 1.0 |  |  |
| Ammonia |  |  |  |  | 0.56 |  |  |
| Temperature, ° C | 80 | 80 | 72 | 72 | 40 |  |  |
| Latex Properties: |  |  |  |  |  |  |  |
| Particle size (microns) | 0.5–1.0 | 1.5 |  | <0.3 | <0.3 | 0.5–1.0 | 0.5–5.0. |
| pH | 4.8 | 4.5 | 5.2 | 5.2 | 9.4 | 4.5 | 4.6. |
| Viscosity (cps.) | 480 | 1,840 | 60 | 570 | 1,770 | 2,080 | 890. |
| Film Properties: |  |  |  |  |  |  |  |
| Water whitening | 7.0 | 37 | 47 | 88.5 | 93.0 | 1.0 | 64. |
| Hardness | 75.8 | 43.0 | 73.2 | 34.9 | 28.0 | 81.4 | 28.9. |
| Brittle point, ° F | 98 | 67 | 76 | 51 | −16 | 91–101 | <−30. |
| Fadometer 200 hrs., 65° C | Badly pocked. | Badly pocked. |  | Very slight pocking. | No pocking | Badly pocked. | Moderate pocking. |

[1] Poly(vinyl acetate).
[2] Vinyl acetate-dibutyl maleate copolymer.

Similar superior results are obtained when the polymerizations are conducted employing comonomer mixtures of vinyl acetate with ethyl methacrylate, dibutyl itaconate, butyl cinnamate, vinyl 2-ethylhexoate, or vinyl chloroacetate. The results are also satisfactory when alkyl aryl sulfonates, alkyl sulfosuccinate salts, or salts of fatty acids are employed as the anionic emulsifier instead of sodium lauryl sulfate.

Components 1 through 5 were charged to a pebble mill and worked into solution. The pigment components 6 through 9 were added to the mill and the mixture was ground for a period of eighteen hours. The "Cellosize" was added to the pigment grind with mild stirring. The "Cellosize" solution contained 0.01 percent Dowicide B as a preservative. The composition of the latex paints prepared was as follows.

TABLE II

| Latex No. | Resin Composition | Water Whitening | | Hardness | | Brittle Point, ° F. | |
|---|---|---|---|---|---|---|---|
| | | Stabilizer | Colloid | Stabilizer | Colloid | Stabilizer | Colloid |
| 6 | Polyvinyl acetate | 47 | 7 | 73 | 70 | 76 | 104 |
| 7 | 10 2-ethylhexyl acrylate / 90 Vinyl acetate | 85 | 24 | 45.5 | 39 | 18 | 75 |
| 8 | 15 2-ethylhexyl acrylate / 85 Vinyl acetate | 88.5 | 37 | 35 | 26 | 51 | 69 |
| 9 | 20 2-ethylhexyl acrylate / 80 Vinyl acetate | 91 | 36 | 19 | 15 | 25 | 74 |
| 10 | 15 Decyl acrylate / 85 Vinyl acetate | 89.5 | | 39 | 41.5 | −3 | 66 |
| 11 | 10 Butyl acrylate / 90 Vinyl acetate | 86 | | 53 | 45 | <−30 | 73 |
| 12 | 20 Butyl acrylate / 80 Vinyl acetate | 89 | | 29 | 25 | <−30 | 46 |
| 13 | 10 Dibutyl maleate / 90 Vinyl acetate | 85 | 10 | 59 | 56 | <−30 | 67 |
| 14 | 20 Dibutyl maleate / 80 Vinyl acetate | 89 | 13 | 45 | 40 | −2 | 58 |
| 15 | 30 Dibutyl maleate / 70 Vinyl acetate | 83 | 4 | 33 | 26 | <−30 | 54 |
| 16 | 20 Dibutyl fumarate / 80 Vinyl acetate | 74 | 18 | 43 | 32 | 0 | 45 |

*Example 3*

The latices prepared in Example 2 which are listed in Table III were formulated at 50 and 70 percent PVC with a standard green pigment grind. The composition of the pigment grind was constituted as follows:

| | Ingredient | Lb./100 gal. | Percent by Weight |
|---|---|---|---|
| 1 | Water | 46 | 10.20 |
| 2 | Tamol "731" (25% solution) | 8 | 1.80 |
| 3 | "Tergitol" NPX | 1 | .20 |
| 4 | Ethylene Glycol | 20 | 4.40 |
| 5 | Pine Oil | 0.1 | .02 |
| 6 | Titanox RA-50 | 46 | 10.20 |
| 7 | Chromium Oxide | 92 | 20.40 |
| 8 | Mica, XXXX | 28 | 6.20 |
| 9 | ASP-400 | 140 | 31.08 |
| 10 | "Cellosize" WP-4400 (2½% solution) | 70 | 15.50 |

| | Weight, Grams | |
|---|---|---|
| | 50% PVC | 70% PVC |
| Pigment grind | 80 | 80 |
| Calculated amount of latex [1] | 32.8 | 14.2 |
| Butyl "Carbitol" Acetate | 2 | |
| "Cellosize" WP-4400 (2½% solution) | 10 | 8 |

[1] Figures shown are for a latex containing 55 percent solids.

Latex No. 25 is a conventionally prepared copolymer which is included for the purpose of emphasizing the superior properties exhibited by the compositions prepared according to the practice of the present invention.

All of the invention latex paints have excellent application properties such as good levelling, brushability, low foaming, color and sheen uniformity, and the like.

TABLE III

| Latex No. | Resin Composition | Total Solids, Percent | Emulsifier, Percent | | Added Solvent, Percent | Stabilizer [1] |
|---|---|---|---|---|---|---|
| | | | Nonionic | Anionic | | |
| 17 | 15 2-ethylhexyl acrylate / 85 Vinyl acetate | 56.0 | 1.6 Tergitol XH | .54 Duponol Me | None | Ammonium Acetate. |
| 18 | 15 2-ethylhexyl acrylate / 85 Vinyl acetate | 56.0 | 1.58 Tergitol XH | .52 Duponol Me | 4.0 Hexylene glycol | Do. |
| 19 | 100 Vinyl acetate | 56.0 | 1.6 Tergitol XH | .53 Duponol Me | 2.1 "Carbitol" Acetate | Do. |
| 20 | do | 54.2 | do | do | do | Do. |
| 21 | 15 2-ethylhexyl acrylate / 85 Vinyl acetate | 54.2 | do | do | do | Do. |
| 22 | 15 2-ethylhexyl acrylate / 85 Vinyl acetate | 55.5 | do | do | None | Do. |
| 23 | 15 2-ethylhexyl acrylate / 85 Vinyl acetate | 55 | do | do | do | Do. |
| 24 | 15 2-ethylhexyl acrylate / 85 Vinyl acetate | 55 | do | do | do | Ammonium Acrylate. |
| 25 | 15 2-ethylhexyl acrylate / 85 Vinyl acetate | 56.5 | .8 Tergitol NPX | .2 Tergitol 4 | do | "Cellosize" .75 WP-09. |

[1] Other polymerizations were conducted employing ammonium benzoate, ammonium citrate, triisopropanolamine, triisopropanolamine acetate, sodium acetate, sodium benzoate.

Freeze-thaw tests were performed on the unpigmented latices. The invention latex compositions performed well, particularly homopolymers No. 19 and No. 20 which were satisfactory after six cycles.

All of the 50 percent PVC latex paints, except No. 24, when heated at 120° F. for a period of ten weeks showed no evidence of latex coagulation.

The latex paints were coated on panels and the coatings were submitted to a variety of tests, the results of which are described in Table IV.

indicates that the coatings prepared from the invention latex compositions have better wet adhesion properties than conventionally prepared polyvinyl acetate latex compositions. Latices No. 20, No. 21, No. 22, No. 23 and No. 24 at 50 percent PVC exhibited good wet adhesion. The invention latex coatings also exhibited very good resistance to wet crocking at 50 percent PVC. The ability to resist wet crocking by the invention latex coatings is about equal with the all-acrylic type coatings. Wet crocking at 70 percent PVC was generally poor but it was

TABLE IV

50 PERCENT PVC

| Latex No. | Water Streaking | Wet Adhesion | Wet Crocking | Scrub Resistance [1] |
|---|---|---|---|---|
| 17 | Fair-good | Fair | Very good | 8 |
| 18 | Good | do | do | 1 |
| 19 | Very good | do | Good | 0 |
| 20 | Fair | do | Very good | 40 |
| 21 | Very good | Fair-good | do | 10 |
| 22 | do | do | do | 0 |
| 23 | do | Very good | Excellent | 0 |
| 24 | do | Fair | Very good | 1 |
| 25 | Poor | Poor | Fair | |

70 PERCENT PVC

| 17 | Good | Poor | Poor | 70 |
|---|---|---|---|---|
| 18 | do | do | Poor-fair | 65 |
| 19 | Fair | Excellent | | 95 |
| 20 | do | Fair | Poor | 60 |
| 21 | do | Poor-fair | do | 15 |
| 22 | do | do | do | 0 |
| 23 | do | do | do | 1 |
| 25 | Poor | Very poor | Very poor | 80 |

[1] 50 Percent PVC—Failure at 2,000 cycles, percent.
70 Percent PVC—Failure at 700 cycles, percent.

Poor resistance to water streaking or spotting has been one of the characteristics of polyvinyl acetate latex paints in contrast to the performance of the all-acrylic type. This relatively poor performance has usually been blamed on the water soluble components in the latices or on the resin system itself. As demonstrated in the present disclosure, polyvinyl acetate systems can be produced which are as resistant to water spotting as the all-acrylic types. The data in Table IV indicates that the PVC level of latex paints has a definite influence on the resistance to water streaking, i.e., coatings produced from the paints become less resistant to the effect of water as the pigment loading increases. At 50 percent PVC most of the copolymer systems of the present invention are rated as very good. Rhoplex AC-33 (all-acrylic latex) [1] was only rated as good in the same formulation. Latex No. 25, a typical polyvinyl acetate copolymer system produced conventionally employing a colloid such as polyvinyl alcohol or hydroxyethyl cellulose, had a rating of poor. The best conventionally prepared polyvinyl acetate copolymer that was examined rated only fair under the same test conditions. An interesting result was the superiority of homopolymers No. 19 and 20 over the conventionally prepared copolymer No. 25. At 70 percent PVC the resistance to streaking was greatly reduced in the invention latex systems but they still rated better at 70 percent PVC than conventional latex No. 25 did at 50 percent PVC. The conventional polyvinyl acetate homopolymer and copolymer coatings at 70 percent PVC were completely inadequate in regard to their resistance to the effect of water.

Poor wet adhesion is another characteristic of polyvinyl acetate latex coatings. The data in the present disclosure

[1] Copolymer of ethyl acrylate/methyl methacrylate/methacrylic acid.

significant that film failure occurred only in one of the homopolymer coatings, while film failure at 70 percent PVC is almost always encountered using the same formulation with conventional polyvinyl acetate latex compositions.

Flexibility and impact tests were performed on the 50 percent latex paint No. 24. At room temperature a coating of the paint passed the one-eighth inch mandrel flexibility test, and the front and rear impact tests. At 38° F. the coating passed the one-eighth inch mandrel test. The frontal impact failed between 25 and 30 in./lb., and rear impact failed between 20 and 25 in./lb. These results indicate acceptable flexibility properties at lower temperatures.

At 50 percent PVC the invention latex copolymer coatings showed very good resistance to scrub. A latex No. 25 conventional type of latex composition showed 5 percent failure after two thousand cycles. At 70 percent PVC the scrub resistance exhibited by the invention latex composition coatings were outstanding, being at least four times as good as conventional latex No. 25 ("Cellosize" stabilized latex). Invention latex compositions No. 22 and No. 23 were particularly excellent in this test. The conventional polyvinyl acetate latex coatings in the same formulation at 70 percent PVC failed rapidly and completely. These results demonstrated that the invention latex compositions are more readily formulated with high pigment loadings than in conventional polyvinyl acetate latex compositions.

*Example 4*

Solution viscosity and particle size determinations were performed on two buffer-stabilized copolymer latices and a buffer-stabilized homopolymer latex. For comparison, the same determinations were made on three copolymer latices and three homopolymer latices which are commercially available. The following results were obtained:

COPOLYMER LATICES

| Latex | Solution Viscosity, cps. | Resin Grade | Particle Size, microns |
|---|---|---|---|
| "Resyn" 12K55 | 2.10 | 5.0 | .5-2 |
| Cl-202 | 1.70 | 3.1 | <.2-1 |
| "Flexbond" 855 | 2.53 | 8.0 | <.5-2 |
| Latex No. 26 | 2.29 | 6.2 | .18-.22 |
| Latex No. 27 | 2.41 | 7.2 | .18-.21 |

HOMOPOLYMER LATICES

| Latex | Solution Viscosity, cps. | Resin Grade | Particle Size, microns |
|---|---|---|---|
| Cl-102 | 1.78 | 3.5 | .5-2 |
| "Elvacet" 81-900 | 3.01 | 10.3 | .5-5 |
| "Darex" 52-L | 4.55 | 45.0 | <.5-1 |
| Latex No. 28 | 2.06 | 4.9 | <.5-1 |

The experimental latices had the following resin compositions:

No. 26—85 vinyl acetate, 15 ethylhexyl acrylate
No. 27—85 vinyl acetate, 15 ethylhexyl acrylate
No. 28—100 vinyl acetate Solution viscosity was determined on a solution of the resin in a water-dimethylformamide system in a ratio of 2 to 5 to 93 parts by weight. This value is related by means of a curve to the solution viscosity in benzene to indicate resin grade values.

Particle size of the latices No. 26 and No. 27 was determined by light scattering methods. A light microscope was used for the other particle size determinations.

What is claimed is:

1. A process for the preparation of stable emulsions of polymers which comprises adding to an aqueous polymerization medium maintained at a temperature between about 60° C. and 90° C. a polymerizable monomer charge of vinyl acetate and between about 0 and 40 weight percent based on total monomer weight of monomer selected from the group consisting of vinyl esters of lower alkanoic acids and lower alkyl esters of an acid selected from the group consisting of acrylic acid, methacrylic acid, crotonic acid, cinnamic acid, atropic acid, maleic aid and itaconic acid, at a rate between about 10 and 50 weight percent of the monomer charge per hour, wherein said polymerization medium has a pH between about 4 and 8 and contains a mixture of components consisting essentially of between about 0.05 and 1 percent based on the monomer charge of emulsion polymerization catalyst, between about 1 and 6 weight percent based on the monomer charge of water-miscible nonionic emulsifier consisting of the alkylene oxide adducts of an aliphatic alcohol, between about 0.25 and 2 weight percent based on the monomer charge of water-miscible anionic emulsifier, and between about 0.05 and 1.0 weight percent based on the monomer charge of an ammonium salt of a carboxylic acid containing between two and about ten carbon atoms, and the total solids content of the final emulsion product is between about 15 and 70 weight percent.

2. A stable polymer emulsion produced by the process of claim 1.

3. A process for the preparation of stable emulsions of polymers which comprises adding to an aqueous polymerization medium maintained at a temperature between about 60° C. and 90° C. a polymerizable monomer charge of vinyl acetate at a rate between about 10 and 50 weight percent of the monomer charge per hour, wherein said polymerization medium has a pH between about 4 and 8 and contains a mixture of components consisting essentially of between about 0.05 and 1 weight percent based on the monomer charge of emulsion polymerization catalyst, between about 1 and 6 weight percent based on the monomer charge of water-miscible poly(propylene oxide-ethylene oxide) having an average molecular weight of at least fifteen hundred, between about 0.25 and 2 weight percent based on the monomer charge of sodium lauryl sulfate, and between about 0.05 and 1.0 weight percent based on the monomer charge of ammonium acetate.

References Cited by the Examiner

UNITED STATES PATENTS

| | | | |
|---|---|---|---|
| 2,339,184 | 1/1944 | Neher | 260—29.6 |
| 2,473,929 | 6/1949 | Wilson | 260—29.6 |
| 2,892,802 | 6/1959 | Budewitz | 260—29.6 |
| 2,956,973 | 10/1960 | Holdsworth | 260—29.6 |
| 3,075,935 | 1/1963 | De Shay | 260—29.6 |
| 3,112,282 | 11/1963 | Jones et al. | 260—29.6 |

MURRAY TILLMAN, *Primary Examiner.*

LEON J. BERCOVITZ, *Examiner.*

H. L. SATZ, E. B. WOODRUFF, *Assistant Examiners.*